(12) United States Patent
Yamamura et al.

(10) Patent No.: US 10,788,469 B2
(45) Date of Patent: Sep. 29, 2020

(54) MASS SPECTROMETRY DATA PROCESSOR, MASS SPECTROMETRY DATA PROCESSING METHOD, AND MASS SPECTROMETRY DATA PROCESSING PROGRAM

(71) Applicant: SHIMADZU CORPORATION, Kyoto-shi, Kyoto (JP)

(72) Inventors: Yutaro Yamamura, Kyoto (JP); Toshikazu Minohata, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/318,181

(22) PCT Filed: Aug. 23, 2016

(86) PCT No.: PCT/JP2016/074549
§ 371 (c)(1),
(2) Date: Jan. 16, 2019

(87) PCT Pub. No.: WO2018/037484
PCT Pub. Date: Mar. 1, 2018

(65) Prior Publication Data
US 2019/0234916 A1    Aug. 1, 2019

(51) Int. Cl.
*G01N 30/00* (2006.01)
*G01N 30/72* (2006.01)
(Continued)

(52) U.S. Cl.
CPC ......... *G01N 30/7206* (2013.01); *G01N 27/62* (2013.01); *H01J 49/0027* (2013.01);
(Continued)

(58) Field of Classification Search
CPC ............... G01N 30/7206; G01N 27/62; G01N 30/8679; H01J 49/0036; H01J 49/04; H01J 49/025; H01J 49/0027
(Continued)

(56) References Cited

U.S. PATENT DOCUMENTS

2005/0063864 A1* 3/2005 Sano et al. .................... 422/68.1
2006/0255263 A1* 11/2006 Ishimaru et al. .............. 250/288
(Continued)

FOREIGN PATENT DOCUMENTS

JP    2005-091344 A    4/2005
JP    2005-265697 A    9/2005
(Continued)

OTHER PUBLICATIONS

Notice of Reasons for Refusal dated Aug. 20, 2019 from the Japanese Patent Office in application No. 2018-535967.
(Continued)

*Primary Examiner* — Michael Maskell
(74) *Attorney, Agent, or Firm* — Sughrue Mion, PLLC

(57) ABSTRACT

A mass spectrometry data processor (2) having a database (21) for storing respective pieces of mass spectrum data of various compounds together with names and mass spectrometry conditions of the compounds includes a mass spectrum data receiver (22) configured to receive input of mass spectrum data associated with a compound name and a mass spectrometry condition, a determination unit (25) configured to determine whether the mass spectrum data includes a mass peak satisfying a predetermined criterion, and a database registration unit (31) that registers, on the database, mass spectrum data determined to include the mass peak satisfying the predetermined criterion or mass spectrum data based on the mass spectrum data determined to include the mass peak satisfying the predetermined cri-
(Continued)

terion together with a compound name and a mass spectrometry condition.

7 Claims, 8 Drawing Sheets

(51) Int. Cl.
*G01N 27/62* (2006.01)
*H01J 49/00* (2006.01)
*H01J 49/02* (2006.01)
*H01J 49/04* (2006.01)
*G01N 30/86* (2006.01)

(52) U.S. Cl.
CPC ........ *H01J 49/0036* (2013.01); *H01J 49/025* (2013.01); *H01J 49/04* (2013.01); *G01N 30/8679* (2013.01)

(58) Field of Classification Search
USPC ................ 250/281, 282, 288; 702/23–28
See application file for complete search history.

(56) References Cited

U.S. PATENT DOCUMENTS

| | | | |
|---|---|---|---|
| 2008/0139396 A1* | 6/2008 | Kameyama et al. | 506/6 |
| 2014/0244185 A1* | 8/2014 | Yamamura et al. | 703/23 |

FOREIGN PATENT DOCUMENTS

| | | |
|---|---|---|
| JP | 2010117377 A | 5/2010 |
| JP | 5362009 B2 | 12/2013 |
| JP | 2016-003865 A | 1/2016 |
| WO | 2005/090963 A1 | 9/2005 |
| WO | 2011/010649 A1 | 1/2011 |

OTHER PUBLICATIONS

Written Opinion of the International Searching Authority of PCT/JP2016/074549 dated Nov. 29, 2016.
International Search Report of PCT/JP2016/074549 dated Nov. 29, 2016.

* cited by examiner

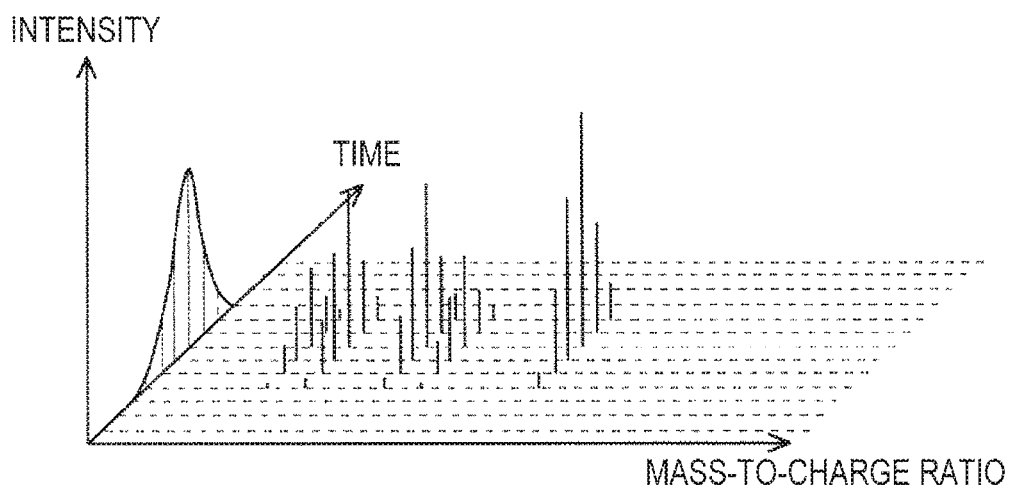

Fig. 5
(a) PEAK INTENSITY FLAG IS GIVEN
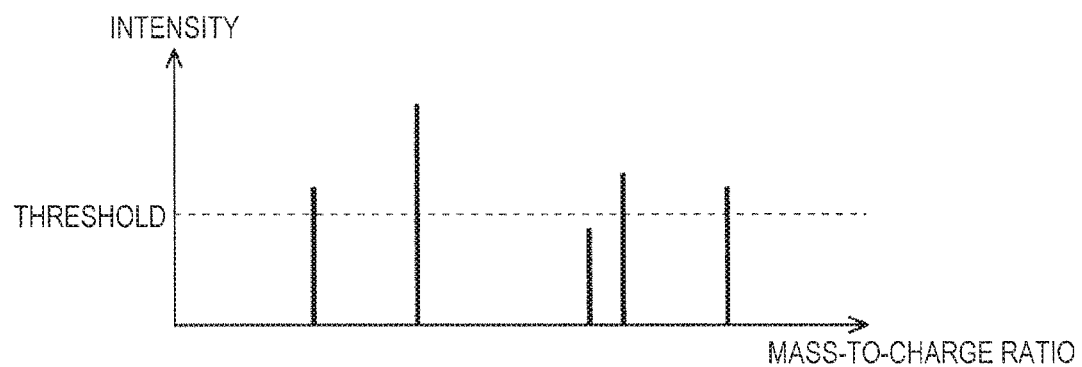
(b) PEAK INTENSITY FLAG IS NOT GIVEN
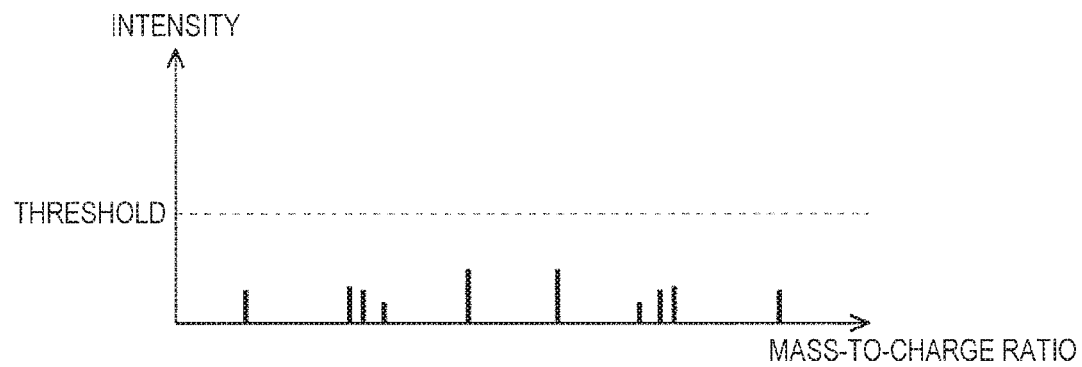

Fig. 6
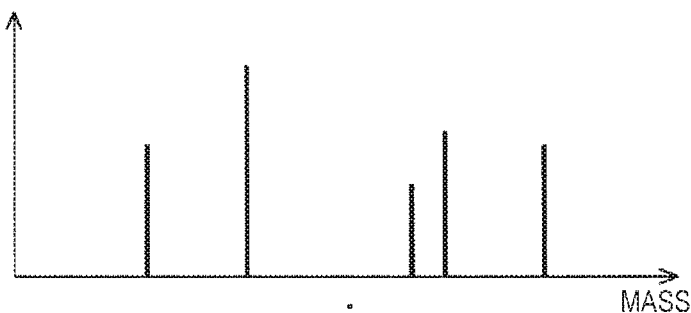
MASS SPECTRUM 1
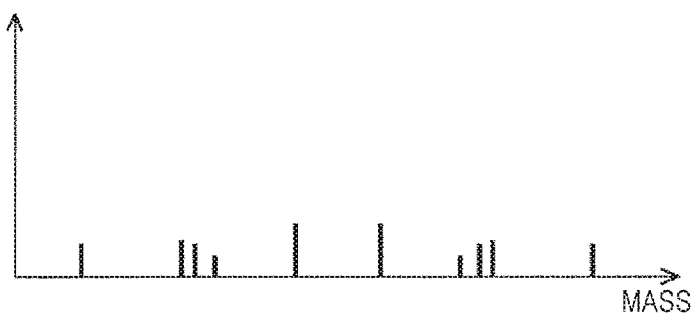
MASS SPECTRUM 10
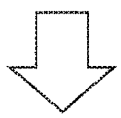
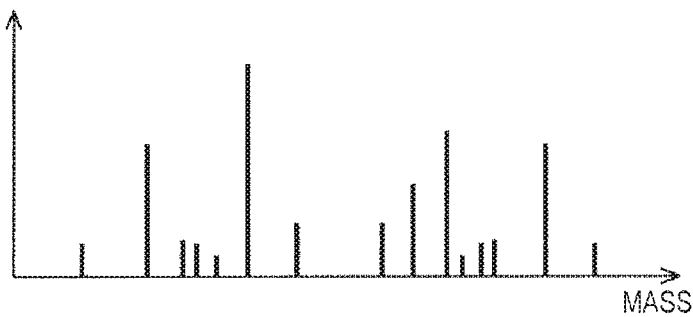
INTEGRATED MASS SPECTRUM

Fig. 7

| | MASS SPECTROMETRY CONDITION | | FLAG | | |
|---|---|---|---|---|---|
| | PRECURSOR ION | COLLISION ENERGY | PEAK INTENSITY | COLLISION ENERGY | INTEGRATION |
| 1 | A | 5V | 1 | | |
| 2 | A | 10V | 1 | 1 | |
| 3 | A | 15V | 1 | | |
| 4 | A | 20V | | | |
| 5 | A | 25V | | | |
| 6 | A | 30V | | 1 | |
| 7 | A | 35V | | | |
| 8 | A | 40V | | | |
| 9 | A | 45V | | | |
| 10 | A | 50V | | 1 | |
| 11 | B | 5V | | | |
| 12 | B | 10V | | 1 | |
| 13 | B | 15V | | | |
| 14 | B | 20V | | | |
| 15 | B | 25V | | | |
| 16 | B | 30V | 1 | 1 | |
| 17 | B | 35V | 1 | | |
| 18 | B | 40V | 1 | | |
| 19 | B | 45V | 1 | | |
| 20 | B | 50V | 1 | 1 | |
| 21 | A | 5-50V | | | 1 |
| 22 | B | 5-50V | | | 1 |

Fig. 8

DATA PROCESSING CONDITION SETTING

○ STANDARD SAMPLE  ⦿ NON STANDARD SAMPLE

⦿ RETENTION TIME DETERMINATION
○ ISOTOPE DETERMINATION

⦿ INTENSITY DETERMINATION
⦿ CREATION OF INTEGRATED MASS SPECTRUM
⦿ MASS SPECTROMETRY CONDITION DETERMINATION

[ START ]　[ CANCEL ]

MASS SPECTROMETRY DATA PROCESSOR, MASS SPECTROMETRY DATA PROCESSING METHOD, AND MASS SPECTROMETRY DATA PROCESSING PROGRAM

CROSS REFERENCE TO RELATED APPLICATIONS

This application is a National Stage of International Application No. PCT/JP2016/074549 filed Aug. 23, 2016.

TECHNICAL FIELD

The present invention relates to a mass spectrometry data processor, a mass spectrometry data processing method, and a mass spectrometry data processing program for constructing a compound database used for identifying a component contained in a sample.

BACKGROUND ART

In the identification (qualitative analysis) of a component in a sample using a chromatograph mass spectrometer, components in the sample are temporally separated by a column of a chromatograph, and the components eluted from the column are introduced into a mass spectrometer, which performs mass scanning to measure ions originating from each of the components. This measurement gives out a total ion chromatogram and a mass spectrum. The retention time at which a peak on the total ion chromatogram thus acquired appears, and the mass-to-charge ratio and the intensity at which a mass peak on the mass spectrum appears are compared with a retention time, a mass-to-charge ratio, and an intensity of a known compound prestored in a database of compounds (compound database), whereby the component in the sample is identified on the basis of a matching degree between the retention times, the mass-to-charge ratios, and the intensities. A method of comparing a plurality of mass spectra using mass-to-charge ratios and intensities of mass peaks of mass spectra obtained through measurement (spectrum pattern) is called pattern matching (for example, Patent Literature 1).

A mass spectrometer unit of such a chromatograph mass spectrometer has various configurations such as a single quadrupole mass spectrometer, a triple quadrupole mass spectrometer and an ion trap-time-of-flight (IT-TOF) mass spectrometer, and types of mass spectra that can be acquired by the configurations are different from each other. The single quadrupole mass spectrometer is the simplest type of mass spectrometer including only one mass separator and is capable of obtaining only a mass spectrum ($MS^1$ spectrum) by performing mass scanning to measure ions originating from components eluted from the column of the chromatograph. The triple quadrupole mass spectrometer is a mass spectrometer including front and rear mass separators with a collision cell interposed between the front and rear mass separators, and is capable of obtaining a product ion spectrum ($MS^2$ spectrum) by selecting an ion (precursor ion) having a specific mass-to-charge ratio from ions originating from the components in the sample and performing mass scanning to measure product ions generated through fragmentation of the precursor ion. Furthermore, the IT-TOF mass spectrometer is a mass spectrometer including an ion trap and a time-of-flight mass separator, and is capable of obtaining an $MS^n$ spectrum (n is an integer equal to or greater than 2) by performing mass scanning to measure product ions generated after performing selection and fragmentation of a precursor ion one or more times. A component with a simple molecular structure can be sometimes identified at a time through pattern matching on the $MS^1$ spectrum. On the other hand, for a component with a complex molecular structure such as a protein or a component originating from a living organism, the component is identified through identifying partial structures with pattern matching on a plurality of $MS^n$ spectra of different precursor ions.

The compound database used for the above comparison is constructed in the following manner.

First, a compound to be registered on the database is introduced into the chromatograph mass spectrometer, and mass scanning is repeatedly performed during a time when the compound is flowing out from the chromatograph to measure ions originating from the compound, whereby a mass spectrum at each time point is acquired. Then, intensities of all ions of the mass spectrum at each time point are summed up and plotted in a direction of the time axis, so that a total ion chromatogram is constructed. The mass spectrum described above may be various types of mass spectrum such as the above-described $MS^1$ spectrum and $MS^n$ spectrum, a precursor ion spectrum, and a neutral loss spectrum, and a plurality of types of mass spectra are usually acquired for one compound stored in the database.

Usually, the same type of mass spectra are acquired under a plurality of different measurement conditions. For example, for the $MS^n$ spectrum, a plurality of precursor ions having different mass-to-charge ratios are each fragmented under a plurality of different fragmentation energy conditions, and the $MS^n$ spectrum is acquired under each condition. This is because the types and amounts of generated ions are different depending on a combination of a type of precursor ion and a fragmentation energy condition.

The $MS^n$ spectrum thus obtained includes not only a mass spectrum containing a mass peak of an ion characteristic of the compound having a sufficient intensity but also a mass spectrum containing no mass spectrum suitable for the above-described pattern matching. If even such mass spectra that cannot be used for the pattern matching are registered on the database, the number of mass spectra registered on the database becomes enormous and the size of the database becomes too large. Further, as the number of mass spectra registered on the database increases, the pattern matching takes time. Therefore, the database operator checks each of the $MS^n$ spectra acquired under different measurement conditions, selects an $MS^n$ spectrum useful for the analysis on the condition that, for example, the mass peak of an ion characteristic of the compound appears with sufficient intensity, and registers such an $MS^n$ spectrum on the database.

CITATION LIST

Patent Literature

Patent Literature 1: JP 2005-265697 A

SUMMARY OF INVENTION

Technical Problem

In recent years, mass spectrometers have been used in various fields, and types of compounds to be analyzed are increasing. To cope with such a situation, it is necessary to also increase registration of mass spectrum data of compounds on a database. In doing so, the operator needs to check and select a mass spectrum one by one from among mass spectra of the compounds under a plurality of different measurement conditions, which leads to a problem in that it takes time and labor.

An object to be solved by the present invention is to provide a mass spectrometry data processor, a mass spectrometry data processing method, and a mass spectrometry data processing program capable of selecting a mass spectrum useful for analysis from among mass spectra acquired under a plurality of different mass spectrometry conditions and registering the mass spectrum on a database in a rather simple way.

Solution to Problem

A first aspect of the present invention made to solve the above problem is directed to a mass spectrometry data processor having a database for storing respective pieces of mass spectrum data of various compounds together with names and mass spectrometry conditions of the compounds, the mass spectrometry data processor including a) a mass spectrum data receiver configured to receive input of mass spectrum data associated with a compound name and a mass spectrometry condition, b) a determination unit configured to determine whether the mass spectrum data includes a mass peak satisfying a predetermined criterion, and c) a database registration unit that registers, on the database, mass spectrum data determined to include the mass peak satisfying the predetermined criterion or mass spectrum data based on the mass spectrum data determined to include the mass peak satisfying the predetermined criterion together with a compound name and a mass spectrometry condition.

The predetermined criterion is, for example, to have an intensity equal to or greater than a predetermined threshold.

The above-described mass spectrum data includes data of a mass spectrum ($MS^1$ spectrum) obtained by performing mass scanning to measure ions originating from a compound, a product ion spectrum ($MS^n$ spectrum where n is an integer equal to or greater than obtained by, after selecting an ion having a specific mass-to-charge ratio from ions originating from the compound as a precursor ion and generating product ions through one or more times of fragmentation of the precursor ion, scanning mass-to-charge ratios to measure the product ions, a precursor ion spectrum obtained by performing mass scanning to select a precursor ion and measuring a product ion having a specific mass-to-charge ratio, and a neutral loss spectrum obtained by performing mass scanning to measure both a precursor ion and a product ion while keeping a difference between mass-to-charge ratios constant.

Further, the database registration unit may be one among: one that registers mass spectrum data determined to include a mass peak satisfying the predetermined criterion on the database as it is; one that registers mass spectrum data resulting from processing the mass spectrum data (for example, normalizing the intensity) on the database; or, as will be described later, one that registers mass spectrum data newly created from a plurality of pieces of mass spectrum data determined to include a mass peak satisfying the predetermined criterion on the database.

The mass spectrometry data processor according to the present invention determines whether mass spectrum data associated with the compound name and the mass spectrometry condition includes a mass peak satisfying the predetermined criterion, and registers, on the database, such mass spectrum data having the mass peak, or mass spectrum data based on such mass spectrum data, together with the compound name and the mass spectrometry condition. As a result, only mass spectrum data useful for pattern matching is selected and registered on the database. The mass spectrometry data processor according to the present invention frees an operator from the work of checking and selecting mass spectrum data and facilitate registering mass spectrum data useful for analysis on the database.

In addition to, as described above, registration of mass spectrum data including a mass peak whose intensity is equal to or greater than the predetermined threshold on the database, it is possible to configure the mass spectrometry data processor according to the present invention to perform various kinds of processes depending on the mass spectrometry condition. For example, the mass spectrometry data processor may be configured to register, on the database, mass spectrum data including a mass peak measured with a predetermined fragmentation energy from among pieces of mass spectrum data of $MS^2$ or more acquired with a plurality of different fragmentation energies. Otherwise the mass spectrometry data processor may be configured to create integrated mass spectrum data by summing up intensities of mass peaks of a plurality of mass spectra and register the integrated mass spectrum data or the like on the database. The mass spectrometry data processor may be further configured to register, on the database, mass spectrum data having an elution time (retention time) from the column of the chromatograph within a predetermined range with respect to mass spectrum data obtained through measurement of a sample containing a plurality of compounds (that is, mass spectrum data having a mass peak measured at a predetermined retention time). The mass spectrometry data processor may be further configured to register, on the database, mass spectrum data having a mass peak corresponding to a possible isotope pattern with respect to mass spectrum data of compounds including an isotope element.

Further, a second aspect of the present invention made to solve the above problem is directed to a mass spectrometry data processing method for registering mass spectrum data on a database for storing respective pieces of mass spectrum data of various compounds together with names and mass spectrometry conditions of the compounds, the mass spectrometry data processing method including a) determining whether mass spectrum data associated with a compound name and a mass spectrometry condition includes a mass peak satisfying a predetermined criterion, and b) registering, on the database, mass spectrum data determined to include the mass peak satisfying the predetermined criterion or mass spectrum data based on the mass spectrum data determined to include the mass peak satisfying the predetermined criterion together with a compound name and a mass spectrometry condition.

Furthermore, a third aspect of the present invention made to solve the above problem is directed to a mass spectrometry data processing program for registering mass spectrum data on a database for storing respective pieces of mass spectrum data of various compounds together with names and mass spectrometry conditions of the compounds, the mass spectrometry data processing program causing a computer to function as a) a mass spectrum data receiver configured to receive input of mass spectrum data associated with a compound name and a mass spectrometry condition, b) a determination unit configured to determine whether the mass spectrum data includes a mass peak satisfying a predetermined criterion, and c) a database registration unit that registers, on the database, mass spectrum data determined to include the mass peak satisfying the predetermined criterion or mass spectrum data based on the mass spectrum data determined to include the mass peak satisfying the predetermined criterion together with a compound name and a mass spectrometry condition.

Advantageous Effects of Invention

The use of the mass spectrometry data processor, the mass spectrometry data processing method, or the mass spectrometry data processing program according to the present invention facilitates selecting a mass spectrum useful for analysis from among mass spectra acquired under a plurality of different mass spectrometry conditions and facilitates registering the mass spectrum on the database.

BRIEF DESCRIPTION OF DRAWINGS

FIG. 3 shows an example of three-dimensional data acquired through measurement using a chromatograph mass spectrometer.

FIG. 4 shows an example of a data processing condition setting screen in the present embodiment.

FIGS. 5(a) and 5(b) are diagrams for describing mass peak intensity determination in the present embodiment.

FIG. 6 is a diagram for describing creation of integrated mass spectrum data in the present embodiment.

FIG. 7 is a diagram for describing a state where flags are given to mass spectrum data in the present embodiment.

FIG. 8 shows another example of the data processing condition setting screen in the present embodiment.

DESCRIPTION OF EMBODIMENTS

Figure 1:
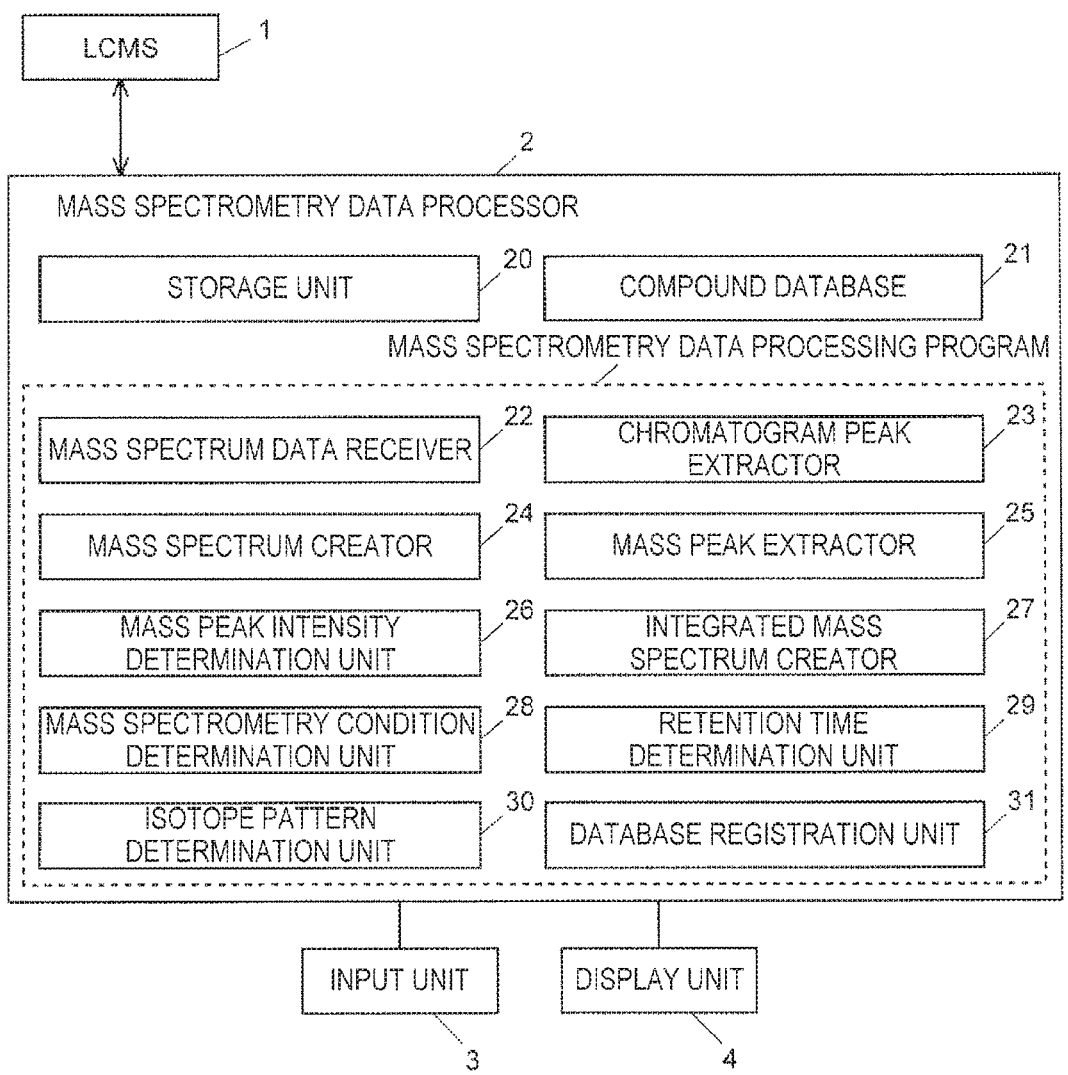
FIG. 1 is a configuration diagram of main components of an embodiment of a mass spectrometry data processor according to the present invention.

Embodiments of a mass spectrometry data processor, a mass spectrometry data processing method, and a mass spectrometry data processing program according to the present invention will be described below with reference to the drawings. A mass spectrometry data processor 2 of the present embodiment is used for registering, on a compound database, mass spectrum data acquired by a liquid chromatograph mass spectrometer (LCMS) 1. FIG. 1 shows a configuration of main components of the mass spectrometry data processor 2.

The liquid chromatograph mass spectrometer 1 includes a chromatograph unit having a column for temporally separating components contained in a sample and a mass spectrometer unit for mass analyzing the components separated by the column. The mass spectrometer unit of the liquid chromatograph mass spectrometer 1 of the present embodiment is a triple quadrupole mass spectrometer. The triple quadrupole mass spectrometer includes front and rear mass separators with a collision cell interposed between the front and rear mass separators. In the triple quadrupole mass spectrometer, a mass spectrum ($MS^1$ spectrum) can be acquired by causing the rear mass separator to perform mass scanning to measure ions originating from the components in the sample, and a product ion spectrum ($MS^2$ spectrum) can be acquired by causing the rear mass separator to perform mass scanning to measure product ions generated through fragmentation, in the collision cell, of an ion (precursor ion) that has a specific mass-to-charge ratio and has been selected by the front mass separator.

In the present embodiment, such a triple quadrupole mass spectrometer is used, but other kinds of mass spectrometers (such as a single quadrupole mass spectrometer unit or an ion trap-time-of-flight (IT-TOF) mass spectrometer unit) may be used.

The single quadrupole mass spectrometer is a popular mass spectrometer having only one mass separator and is capable of obtaining a mass spectrum ($MS^1$ spectrum) by performing mass scanning to measure ions that originate from the components and have been eluted from the column of the chromatograph unit.

The triple quadrupole mass spectrometer is a mass spectrometer having front and rear mass separators with a collision cell interposed between the front and rear mass separators and is capable of obtaining a product ion spectrum ($MS^2$ spectrum) by performing mass scanning to measure product ions generated through fragmentation of an ion (precursor ion) that has a specific mass-to-charge ratio and has been selected from among ions originating from the components in the sample.

The IT-TOF mass spectrometer is a mass spectrometer having an ion trap and a time-of-flight mass separator and is capable of obtaining an $MS^n$ spectrum (n is an integer of 2 or more) by performing mass scanning to measure product ions generated after selecting a precursor ion and perforating fragmentation of the precursor ion one or more times.

Further, in the present embodiment, the mass spectrometry data processor and the chromatograph mass spectrometer are integrally configured, but mass spectrum data acquired by a separate chromatograph mass spectrometer may be input to and processed in the mass spectrometry data processor.

The mass spectrometry data processor 2 of the present embodiment includes, in addition to a storage unit 20 and a compound database 21, a mass spectrum data receiver 22, a chromatogram peak extractor 23, a mass spectrum creator 24, a mass peak extractor 25, a mass peak intensity determination unit 26, an integrated mass spectrum creator 27, a mass spectrometry condition determination unit 28, a retention time determination unit 29, an isotope pattern determination unit 30, and a database registration unit 31 as functional blocks. The mass spectrometry data processor 2 is a personal computer, and the functional blocks are implemented by the mass spectrometry data processing program executed on the computer. Further, the mass spectrometry data processor 2 is connected with an input unit 3 and a display unit 4.

Figure 2:
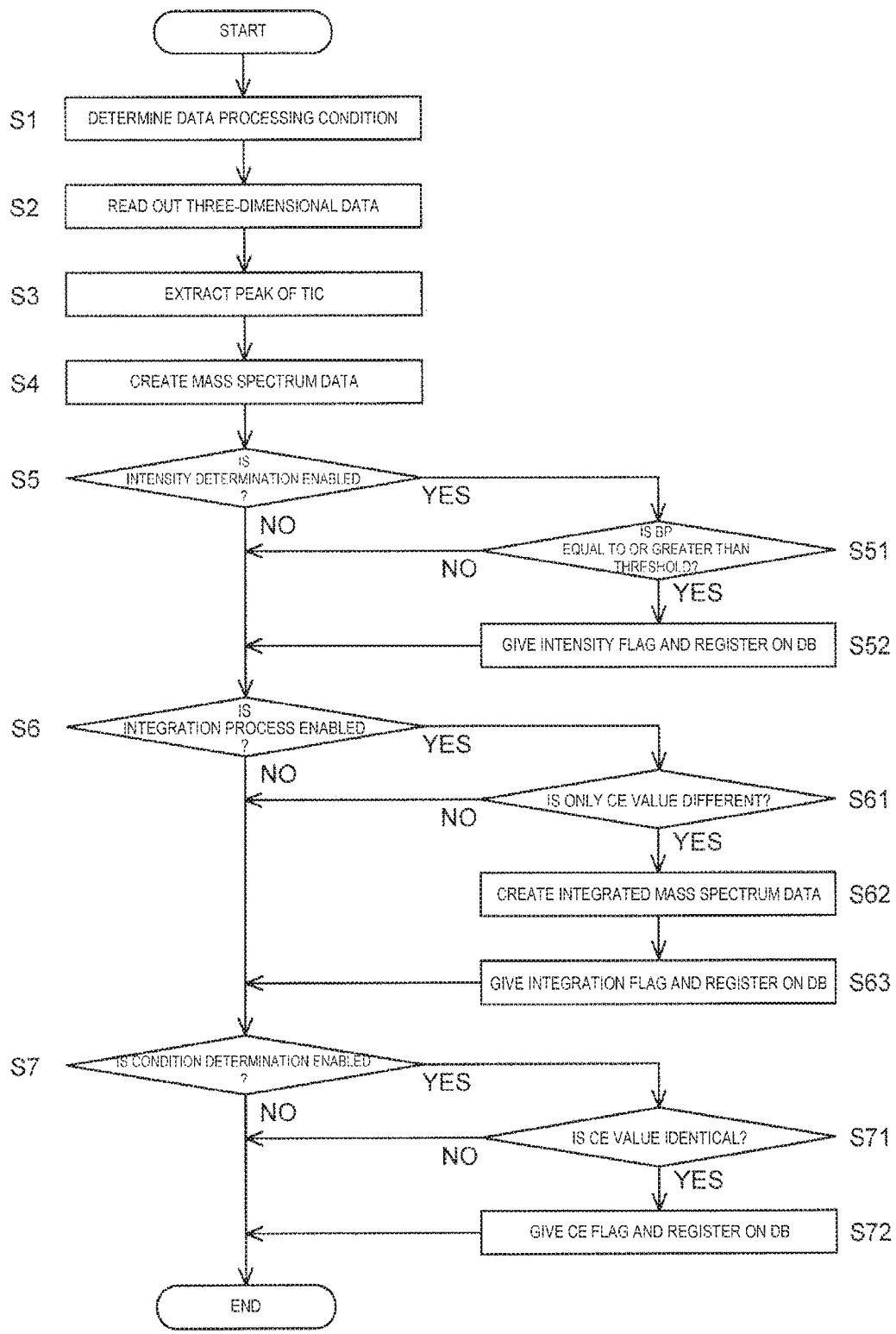
FIG. 2 is a flowchart according to an embodiment of a mass spectrometry data processing method according to the present invention.

Hereinafter, a description will be given, with reference to the flowchart of FIG. 2, of an example where the mass spectrometry data processor 2 of the present embodiment acquires three-dimensional data (data corresponding to detected intensities of ions represented on two axes of a time axis and a mass-to-charge ratio axis) by mass analyzing a compound under 20 mass spectrometry conditions, each of which has a unique combination of a plurality of kinds of precursor ions (herein, an ion A and an ion B) and a plurality of collision energy values (10 values ranging from 5 V to 50

V at intervals of 5 V) for fragmentation of each of the precursor ions in an MS' scan analysis and processes the three-dimensional data.

When a mass spectrometry condition of a target compound is determined and measurement of the target compound is instructed, a standard sample of the compound is introduced into the chromatograph unit of the liquid chromatograph mass spectrometer 1. The target compound introduced into the chromatograph unit is eluted from the column of the chromatograph unit in a retention time range of the target compound (a time range centered on a retention time of the compound) and introduced into an ionization unit. Ions generated by the ionization unit are introduced into the front mass separator, and, after being selected from among the ions, the precursor ion A (or B) is introduced into the collision cell to which collision energy (5 V to 50 V) is applied. In the collision cell, the precursor ion is fragmented into product ions, and the rear mass separator performs mass scanning to measure the product ions. The above process is performed under each of the 20 mass spectrometry conditions, which allows the three-dimensional data to be obtained under each of the mass spectrometry conditions. FIG. 3 shows an example of the three-dimensional data. The three-dimensional data thus obtained is stored in the storage unit 20 of the mass spectrometry data processor 2 with the three-dimensional data associated with a compound name and a mass spectrometry condition.

When a user chooses the three-dimensional data stored in the storage unit 20 and instructs processing the data, the mass spectrum data receiver 22 displays a data processing condition setting screen as shown in FIG. 4.

The data processing condition setting screen includes a button for selecting whether the three-dimensional data is obtained through measurement of the standard sample, and a button for determining a type of processing on the three-dimensional data (intensity determination, creation of integrated mass spectrum data, and mass spectrometry condition determination). Herein, a description will be given of an example where all types of processing are performed on the three-dimensional data, but it is not always necessary to perform all the types of processing on data.

When the user makes the above settings on the data processing condition setting screen and presses a start button (step S1), the mass spectrum data receiver 22 reads out designated three-dimensional data thus chosen (step S2). Subsequently, the chromatogram peak extractor 23 creates total ion chromatogram (TIC) data by summing up intensities of ions measured at each time point on the time axis of the three-dimensional data, and extracts a peak from the total ion chromatogram data (step S3). Extraction of the peak of the chromatogram may be achieved by a conventionally known method, such as a method where, for example, a time point when a gradient of the chromatogram becomes equal to or greater than a predetermined value is regarded as a peak start point, and a time point when the gradient of the chromatogram subsequently becomes equal to or less than the predetermined value is regarded as a peak end point.

When the peak of the total ion chromatogram is extracted, the mass spectrum creator 24 cuts the three-dimensional data in a direction of the mass-to-charge ratio axis at the retention time of a peak top of the total ion chromatogram to create mass spectrum data (step S4). Alternatively, the mass spectrum creator 24 may create the mass spectrum data by averaging a plurality of pieces of mass spectrum data acquired within a predetermined time width centered on the retention time of the peak top in a direction of the time axis. The user can appropriately determine which method to be used for creation of the mass spectrum data and can appropriately determine a time width applied to the latter method. Although the present embodiment includes a step of creating the total ion chromatogram and the mass spectrum data in order to process the three-dimensional data, a configuration where mass spectrum data created in advance is processed eliminates the need for the processes of steps S3 and S4.

In the present embodiment, as described above, the data processing condition is determined to enable the intensity determination (YES in step S5). When mass spectrum data is generated from the three-dimensional data under each of the mass spectrometry conditions, the mass peak extractor 25 extracts a mass peak (a base peak denoted as "BP" in FIG. 2) having the highest intensity in each piece of mass spectrum data. Subsequently, the mass peak intensity determination unit 26 determines whether the intensity of the base peak thus extracted exceeds a predetermined threshold (in other words, determines whether a mass peak whose intensity exceeds the threshold is present), and a peak intensity flag is given to mass spectrum data (FIG. 5(*a*)) including a mass peak exceeding the threshold (YES in step S51) (FIG. 7). The mass spectrum data to which this flag has been given is registered on the compound database 21 (denoted as "DB" in FIG. 2) together with the compound name and the mass spectrometry condition by the database registration unit 31 (step S52). Mass spectrum data (FIG. 5(*b*)) having a base peak whose intensity is equal to or less than the threshold (NO in step S51) is not registered on the compound database 21. The mass spectrum data to which the peak intensity flag has been given and stored in the compound database 21 is used for pattern matching to identify, for example, an unknown component contained in the sample. When mass spectrum data is registered on the compound database 21, mass spectrum data having actually-measured intensity may be registered as it is, or mass spectrum data that has been entirely normalized such that the intensity of the base peak is equal to a predetermined value may be registered. Note that when the intensity determination is disabled in the data processing condition (NO in step S5), the process proceeds directly to the next step S6.

In the present embodiment, as described above, the data processing condition is determined to enable the creation of integrated mass spectrum data (YES in step S6). Accordingly, the integrated mass spectrum creator 27 determines whether mass spectrum data chosen includes a mass peak that is identical in the compound name and the type of precursor ion, but different only in the collision energy value (step S61). Then, the integrated mass spectrum creator 27 creates integrated mass spectrum data 21 by summing up peak intensities of applicable pieces of mass spectrum data (FIG. 6) (step S62), and an integration flags is given to the applicable pieces of mass spectrum data (FIG. 7). Mass spectrum data to which this flag has been given is also registered on the compound database 21 together with the compound name and the mass spectrometry condition by the database registration unit 31 (step S63). This integrated mass spectrum data corresponds to mass spectrum data exhaustively including respective mass peaks of ions generated from the target compound. The integrated mass spectrum data is stored in the compound database with an integration flag given to the integrated mass spectrum data. Note that when the creation of integrated mass spectrum data is disabled in the data processing condition (NO in step S6), the process proceeds directly to the next step S7.

The integrated mass spectrum data to which the integration flag has been given is used for the purpose of, for example, identifying an unknown component on the basis of whether all the mass peaks on the actually-measured mass spectrum of the unknown component are included in the integrated mass spectrum data or the like. At this time, for an unknown component, actually-measured pieces of mass spectrum data acquired under each of the plurality of mass spectrometry conditions are integrated into integrated actually-measured mass spectrum data, and the integrated actually-measured mass spectrum data is compared with the integrated mass spectrum data stored in the compound database 21, which allows the unknown component to be identified with higher accuracy. Note that the creation of integrated mass spectrum data by the integrated mass spectrum creator 27 also allows mass peak intensities of all pieces of mass spectrum data to be summed up as described above, allows an average intensity of mass peaks having the same mass-to-charge ratio to be obtained, and allows a mass peak having a maximum intensity to be extracted from among mass peaks having the same mass-to-charge ratio. These processes performed when the integrated mass spectrum data is created may be performed using the actually-measured mass peak intensity as it is or after the actually-measured mass peak intensity is normalized. For example, when a variation in mass peak intensity among mass spectra to be integrated is large, the integration is desirably performed after mass peak intensities are normalized (for example, intensities of base peaks of mass spectra are changed to be identical to each other).

In the present embodiment, as described above, the data processing condition is determined to enable the mass spectrometry condition determination (YES in step S7). Accordingly, the mass spectrometry condition determination unit 28 determines whether the collision energy (10 collision energy (CE) values in the present embodiment) set in the mass spectrometry condition of each piece of mass spectrum data is equal to a predetermined value (herein, any one of three values 10 V, 30 V, and 50 V) (step S71) and gives a collision energy flag to matching mass spectrum data (FIG. 7). The mass spectrum data to which this flag has been given is also registered on the compound database 21 together with the compound name and the mass spectrometry condition by the database registration unit 31 (step S72). When mass spectrum data is registered on the compound database 21, mass spectrum data having actually-measured intensity may be registered as it is, or mass spectrum data that has been entirely normalized such that the intensity of the base peak is equal to the predetermined value may be registered. The mass spectrum data to which the CE flag has been given is referred to, for example, in order to determine an optimal collision energy value in multiple reaction monitoring (MRM) measurement performed when a target component in the sample is quantified. The above predetermined collision energy value may be determined each time by the user on the above-described data processing condition setting screen.

Figure 9:
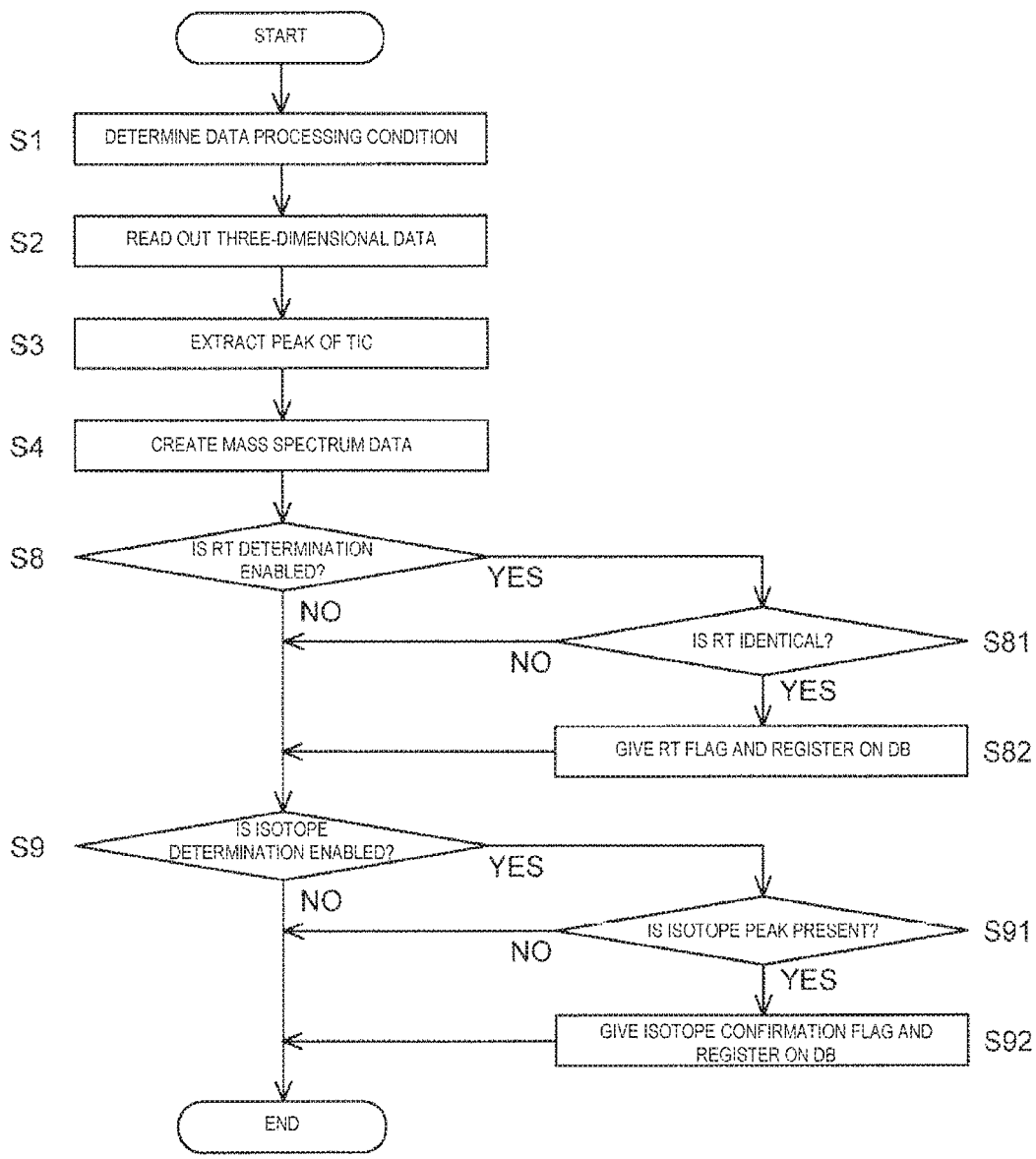
FIG. 9 is another flowchart relating to the mass spectrometry data processing method of the present embodiment.

In the above embodiment, the flow of registration of mass spectrum data measured using a standard sample of a target compound on the compound database has been described. For biological metabolite or an environmental sample, it may be difficult to obtain a standard sample or a purity of a standard sample may be low to obtain the mass spectrum data. Hereinafter, data processing to be performed in such a case will be described. In such a case, the user selects "non-standard sample" on the data processing condition setting screen, and in response to this selection, the data processing condition setting screen displays a button for selecting retention time determination or isotope determination in addition to items shown in FIG. 4 (FIG. 8). Herein, a description will be given, with reference to the flowchart of FIG. 9, of an example where both the retention time determination and isotope determination are performed.

Figure 10:
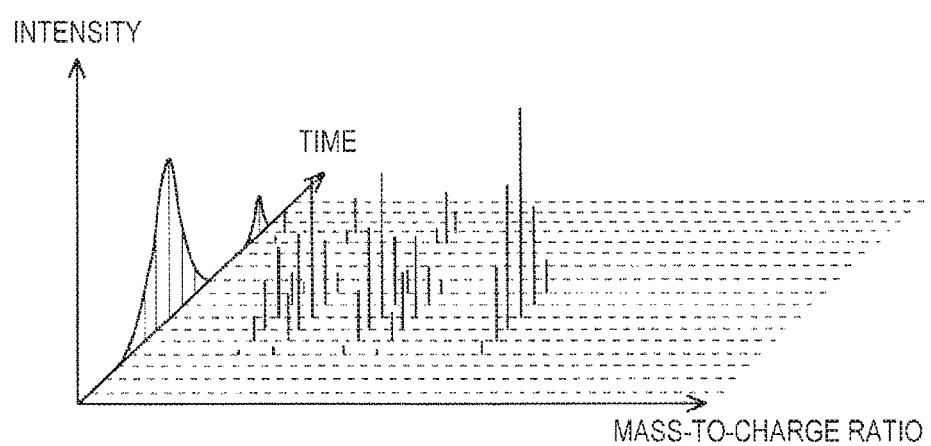
FIG. 10 shows another example of the three-dimensional data acquired through measurement using the chromatograph mass spectrometer.

When a sample containing a compound other than the target compound is introduced into the chromatograph unit, the target compound and the other compound (contaminating compound) are temporally separated by the column and then introduced into the mass spectrometer. When components eluted from the column are measured under the above-described 20 mass spectrometry conditions, three-dimensional data including peaks of a chromatogram and mass peaks can be obtained for both the target compound and the contaminating compound. An example of the three-dimensional data is shown in FIG. 10.

When the user makes the above settings on the data processing condition setting screen and presses the start button (step S1), the mass spectrum data receiver 22 reads out three-dimensional data (step S2). Then, the chromatogram peak extractor 23 creates total ion chromatogram data by summing up values at each time point in the direction of the mass-to-charge ratio axis (step S3) and extracts a peak from the total ion chromatogram data. At this point, a plurality of respective peaks of the compounds contained in the sample are extracted.

When the plurality of peaks are extracted from the total ion chromatogram data, the mass spectrum creator 24 cuts the three-dimensional data at the retention time of each peak top in the total ion chromatogram to create mass spectrum data (step S4). Alternatively, the mass spectrum creator 24 may create the mass spectrum data by averaging a plurality of pieces of mass spectrum data acquired within a predetermined time width centered on the retention time of the peak top in the direction of the time axis. As a result, a plurality of pieces of mass spectrum data are created. Steps S1 to S4 are the same as steps S1 to S4 in the flowchart of FIG. 2.

In the present embodiment, as described above, the data processing condition is determined to enable the retention time determination (YES in step S8). Accordingly, the retention time determination unit 29 checks a time (retention time) at which each piece of mass spectrum data is acquired and determines whether the retention time is identical to a preset retention time (RT) of the target compound (step S81). Then, a retention time flag is given to mass spectrum data whose retention time has been determined to be identical, and the mass spectrum data is registered on the compound database 21 (step S82). As a result, the mass spectrum data corresponding to the target compound is correctly registered on the compound database 21 even from the three-dimensional data resulting from analyzing, by mass spectrometry, the sample containing the contaminating compound. In the present embodiment the mass spectrum data of the target compound is selected on the basis of the retention time after the creation of the total ion mass chromatogram data, but only the peak of the target compound may be selected when the peak top of the chromatogram is identified (step S81 is executed) and mass spectrum data may be created from the peak.

Normally, when the retention time of the target compound is unknown, the isotope pattern is determined. In the present embodiment, as described above, the data processing condition is determined to enable the isotope pattern determination in addition to the retention time determination (YES in step S9). Accordingly, the isotope pattern determination unit 30 determines whether the mass spectrum data created in the above steps includes a mass peak reflecting an isotope pattern predicted from an element contained in the target compound (step S91). Then, an isotope confirmation flag is given to the mass spectrum data reflecting the isotope pattern thus predicted, and the mass spectrum data is registered on the compound database 21 (step S92). As with the retention time flag, this isotope confirmation flag means that the mass spectrum data is determined to correspond to the target compound.

The above embodiment is merely an example and can be appropriately changed in accordance with the spirit of the present invention.

In the above embodiment, the intensity determination, the creation of integrated mass spectrum data, and the mass analysis condition determination are performed in this order, but the order can be appropriately changed. Similarly, the order of the retention time determination and the isotope determination can be changed as appropriate.

In the above embodiment, a description has been given of an example where the three-dimensional data acquired by the liquid chromatograph mass spectrometer is processed, but three-dimensional data acquired by a gas chromatograph mass spectrometer can be processed in a similar manner. Further, mass spectrum data acquired through measurement using only a mass spectrometer without a chromatograph can be processed in a similar manner as described above. This configuration eliminates the need for creation of mass spectrum data from total ion chromatogram data. Note that this configuration disables the retention time determination; thus, mass spectrum data is desirably acquired by using a compound of a preparation.

REFERENCE SIGNS LIST

1 . . . Liquid Chromatograph Mass Spectrometer
2 . . . Mass Spectrometry Data Processor
20 . . . Storage Unit
21 . . . Compound Database
22 . . . Mass Spectrum Data Receiver
23 . . . Chromatogram Peak Extractor
24 . . . Mass Spectrum Creator
25 . . . Mass Peak Extractor
26 . . . Mass Peak Intensity Determination Unit
27 . . . Integrated Mass Spectrum Creator
28 . . . Mass Spectrometry Condition Determination Unit
29 . . . Retention Time Determination Unit
30 . . . Isotope Pattern Determination Unit
31 . . . Database Registration Unit
3 . . . Input Unit
4 . . . Display Unit

The invention claimed is:

1. A mass spectrometry data processor having a database for storing respective pieces of mass spectrum data of various compounds together with names and mass spectrometry conditions of the compounds, the mass spectrometry data processor comprising:
  a) a mass spectrum data receiver configured to receive input of mass spectrum data associated with a compound name and a mass spectrometry condition;
  b) a determination unit configured to determine whether the mass spectrum data includes a mass peak satisfying a predetermined criterion; and
  c) a database registration unit that registers, on the database, mass spectrum data determined to include the mass peak satisfying the predetermined criterion or mass spectrum data based on the mass spectrum data determined to include the mass peak satisfying the predetermined criterion together with a compound name and a mass spectrometry condition, wherein:

the mass spectrum data is a plurality of pieces of MS$^n$ spectrum data, where n is an integer equal to or greater than 2, acquired through measurement of product ions generated through one or more times of fragmentation of a precursor ion, the determination unit determines whether mass spectrum data is different only in a value of fragmentation energy for fragmenting the precursor ion in the mass spectrometry condition; and the database registration unit creates integrated mass spectrum data including the mass spectrum data different only in the value of fragmentation energy.

2. The mass spectrometry data processor according to claim 1, wherein
the predetermined criterion is to have an intensity exceeding a predetermined threshold.

3. The mass spectrometry data processor according to claim 1, wherein
the determination unit determines whether the value of fragmentation energy for fragmenting the precursor ion in the mass spectrometry condition is equal to a predetermined value, and
the database registration unit registers, on the database, mass spectrum data having the value of fragmentation energy equal to the predetermined value.

4. The mass spectrometry data processor according to claim 1, wherein
the mass spectrum data is three-dimensional data including time-axis data acquired by a chromatograph mass spectrometer,
the determination unit determines whether mass spectrum data is acquired at a predetermined retention time, and
the database registration unit registers, on the database, mass spectrum data acquired at the predetermined retention time.

5. The mass spectrometry data processor according to claim 1, wherein
the compound is a compound containing an isotope element,
the determination unit determines whether a mass peak estimated from the isotope element is included, and
the database registration unit registers, on the database, mass spectrum data including the estimated mass peak.

6. A mass spectrometry data processing method for registering mass spectrum data on a database for storing respective pieces of mass spectrum data of various compounds together with names and mass spectrometry conditions of the compounds, the mass spectrometry data processing method comprising:
  a) determining whether mass spectrum data associated, with a compound name and a mass spectrometry condition includes a mass peak satisfying a predetermined criterion;
  b) registering, on the database, mass spectrum data determined to include the mass peak satisfying the predetermined criterion or mass spectrum data based on the mass spectrum data determined to include the mass peak satisfying the predetermined criterion together with a compound name and a mass spectrometry condition;
  c) determining whether the mass spectrum data is different only in a value of fragmentation energy for fragmenting the precursor ion in the mass spectrometry condition; and
  d) creating integrated mass spectrum data including the mass spectrum data different only in the value of fragmentation energy, wherein the mass spectrum data is a plurality of pieces of $MS^n$ spectrum data, where n is an integer equal to or greater than 2, acquired through measurement of productions generated through one or more times of fragmentation of a precursor ion.

7. A mass spectrometry data processing program stored in a non-transitory computer readable medium, the mass spectrometry data processing program for registering mass spectrum data on a database for storing respective pieces of mass spectrum data of various compounds together with names and mass spectrometry conditions of the compounds, the mass spectrometry data processing program causing a computer to function as:

a) a mass spectrum data receiver configured to receive input of mass spectrum data associated with a compound name and a mass spectrometry condition;

b) a determination unit configured to determine whether the mass spectrum data includes a mass peak satisfying a predetermined criterion;

c) a database registration unit that registers, on the database, mass spectrum data determined to include the mass peak satisfying the predetermined criterion or mass spectrum data based on the mass spectrum data determined to include the mass peak satisfying the predetermined criterion together with a compound name and a mass spectrometry condition;

d) the determination unit determines whether mass spectrum data is different only in a value of fragmentation energy for fragmenting the precursor ion in the mass spectrometry condition; and e) the database registration unit creates integrated mass spectrum data including the mass spectrum data different only in the value of fragmentation energy, wherein the mass spectrum data is a plurality of pieces of $MS^n$ spectrum data, where n is an integer equal to or greater than 2, acquired though measurement of product ions generated through one or more times of fragmentation of the precursor ion.

* * * * *